(12) United States Patent
Kang et al.

(10) Patent No.: US 9,423,517 B2
(45) Date of Patent: Aug. 23, 2016

(54) X-RAY IMAGING APPARATUS AND METHOD OF CONTROLLING THE SAME

(71) Applicant: SAMSUNG ELECTRONICS CO., LTD., Suwon-si (KR)

(72) Inventors: Sung Hoon Kang, Suwon-si (KR); Dong Goo Kang, Suwon-si (KR); Sang Wook Han, Busan (KR); Young Hun Sung, Hwaseong-si (KR); Hyun Hwa Oh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 14/144,766

(22) Filed: Dec. 31, 2013

(65) Prior Publication Data

US 2014/0185766 A1 Jul. 3, 2014

(30) Foreign Application Priority Data

Dec. 31, 2012 (KR) ........................ 10-2012-0158361

(51) Int. Cl.
*G01D 18/00* (2006.01)
*G01T 7/00* (2006.01)
*G01T 1/169* (2006.01)

(52) U.S. Cl.
CPC ................. *G01T 7/005* (2013.01); *G01T 1/169* (2013.01)

(58) Field of Classification Search
CPC ......... H04N 5/30; H04N 5/32; A61B 6/4233; A61B 6/4241; A61B 6/58; A61B 6/582; A61B 6/583; A61B 6/585; G01T 1/2928; G06T 2207/10116
USPC .............................. 378/62, 98.8, 207; 382/132
See application file for complete search history.

(56) References Cited

U.S. PATENT DOCUMENTS

| | | | |
|---|---|---|---|
| 6,408,050 B1 | 6/2002 | Han et al. | |
| 2014/0233693 A1* | 8/2014 | Wang et al. | 378/5 |

FOREIGN PATENT DOCUMENTS

| | | |
|---|---|---|
| JP | 2008538971 A | 11/2008 |
| JP | 2010513860 A | 4/2010 |
| JP | 2011085479 A | 4/2011 |

* cited by examiner

*Primary Examiner* — Jurie Yun
(74) *Attorney, Agent, or Firm* — Sughrue Mion, PLLC

(57) ABSTRACT

An X-ray imaging apparatus includes an X-ray generator configured to generate and emit X-rays, an X-ray detector configured to detect the X-rays and count a number of photons having energy equal to or greater than threshold energy per pixel among photons contained in the detected X-rays, a map generator configured to extract corrected threshold energy corresponding to target threshold energy mapped to each pixel, and a data correction unit configured to calculate corrected X-ray data corresponding to the corrected threshold energy per pixel from a plurality of X-ray data acquired based on a plurality of images of a target object obtained by using a plurality of approximate energies equal or approximate to the target threshold energy as threshold energy of the X-ray detector.

20 Claims, 14 Drawing Sheets

X-RAY IMAGING APPARATUS AND METHOD OF CONTROLLING THE SAME

CROSS-REFERENCE TO RELATED APPLICATION(S)

This application claims priority from Korean Patent Application No. 2012-0158361, filed on Dec. 31, 2012, in the Korean Intellectual Property Office, the disclosure of which is incorporated herein by reference in its entirety.

BACKGROUND

1. Field

Apparatuses and methods consistent with the exemplary embodiments relate to an X-ray imaging apparatus and a method of controlling the same, which passes X-rays through a target object to generate an X-ray image.

2. Description of the Related Art

An X-ray imaging apparatus irradiates a target object with X-rays and uses X-rays having passed through the target object to acquire an internal image of the target object. X-ray permeability may differ according to tissues constituting the target object. Thus, intensity or strength of X-rays having passed through the target object is detected to image the internal structure of the target object.

In particular, when an X-ray generator generates X-rays and irradiates a target object with the generated X-rays, an X-ray detector detects X-rays transmitted through the target object and converts the detected X-rays into an electrical signal. Conversion into an electrical signal may be performed for each pixel and thus electrical signals corresponding to respective pixels are combined to acquire an X-ray image of the target object.

Conventionally, a method of reading out electrical signals accumulated for a certain period of time is widely used. Recently, a photon counting detector (PCD) for sorting detected X-rays according to energies thereof by counting photons with a certain energy level or higher has been developed.

The PCD may extract a particular material from an X-ray image and is advantageous in terms of less X-ray exposure and less noise. However, the PCD is affected by characteristics of a light receiving element or characteristics of a readout circuit corresponding to each pixel. Thus, when X-rays with the same energy are irradiated to all the pixels, different counter values for each pixel may be output, which may cause an image noise.

SUMMARY

One or more exemplary embodiments provide an X-ray imaging apparatus for correcting errors according to characteristics of each pixel and a method for controlling the X-ray imaging apparatus.

Additional aspects of the disclosure will be set forth in part in the description which follows and, in part, will be obvious from the description, or may be learned by practice of the disclosure.

In accordance with an aspect of an exemplary embodiment, an X-ray imaging apparatus includes an X-ray generator configured to generate and emit X-rays, an X-ray detector configured to detect the X-rays and count a number of photons having energy equal to or more than threshold energy per pixel among photons contained in the detected X-rays, a map generator configured to extract corrected threshold energy corresponding target threshold energy mapped to each pixel, and a data correction unit configured to calculate corrected X-ray data corresponding to the corrected threshold energy per pixel from a plurality of X-ray data acquired based on a plurality of images of a target object obtained by using a plurality of approximate energies equal to or approximate to the target threshold energy as threshold energy of the X-ray detector.

The map generator may include a curve generator to generate a curve of X-ray data relative to varying threshold energy measured per pixel with respect to a predesigned phantom.

The map generator may further include a simulation unit configured to calculate theoretical X-ray data corresponding to the target threshold energy per pixel under the same conditions as conditions of measurement of the X-ray data.

The map generator may further include an energy mapping unit configured to extract threshold energy for obtaining the theoretical X-ray data corresponding to the target threshold energy from the curve of the measured X-ray data and map the extracted threshold energy as the corrected threshold energy to a corresponding pixel.

The X-ray data may be represented by a ratio of intensity of X-rays emitted to the predesigned phantom and intensity of X-rays having passed through the predesigned phantom.

The data correction unit may calculate the corrected X-ray data corresponding to the corrected threshold energy per pixel using at least one of interpolation, curve fitting, and weighted sum.

The data correction unit may estimate a function representing a relationship between threshold energy and X-ray data from the plurality of images of the target object obtained by using the plurality of approximate energies as the threshold energy and insert the corrected threshold energy into the estimated function to calculate corrected X-ray data.

The data correction unit may apply weights to X-ray data respectively acquired by using the plurality of approximate energies as threshold energy and calculate the corrected X-ray data based on the weight applied X-ray data.

In accordance with an aspect of another exemplary embodiment, a method of controlling an X-ray imaging apparatus including a photon counting detector (PCD) includes acquiring corrected threshold energy corresponding to target threshold energy mapped to each pixel of the PCD, obtaining a plurality of images of a target object by using a plurality of approximate energies equal or approximate to the target threshold energy as threshold energy of the PCD, and calculating corrected X-ray data corresponding to the corrected threshold energy per pixel from a plurality of X-ray data acquired based on the plurality of images of the target object.

In accordance with an aspect of another exemplary embodiment, an X-ray imaging apparatus includes a photon counting detector (PCD) configured to count a number of photons having energy equal to or greater than threshold energy per pixel among photons contained in X-rays passing through a target object; a storage configured to store a mapping table in which each pixel is mapped to corrected threshold energy for obtaining normalized intensity of the X-rays passing through the target object corresponding to target threshold energy; and a data correction unit configured to obtain an image of the target object corresponding to the target threshold energy based on the mapping table and a plurality of images of the target object obtained by using a plurality of approximate energies equal or approximate to the target threshold energy as threshold energy of the PCD.

BRIEF DESCRIPTION OF THE DRAWINGS

The above and/or other aspects will become more apparent by describing certain exemplary embodiments with reference to the accompanying drawings in which.

DETAILED DESCRIPTION

Figure 1:
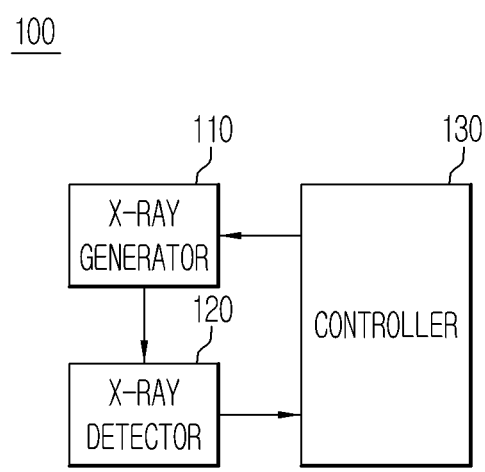
FIG. 1 is a block diagram of an X-ray imaging apparatus according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 is a block diagram of an X-ray imaging apparatus 100 according to an exemplary embodiment.

Referring to FIG. 1, the X-ray imaging apparatus 100 according to an exemplary embodiment includes an X-ray generator 110 to generate X-rays and to irradiate a target object with the X-rays, an X-ray detector 120 to detect X-rays having passed through the target object to acquire X-ray data, and a controller 130 to correct the X-ray data according to characteristics of a light receiving device per pixel and a read-out circuit.

The X-ray generator 110 generates the X-rays and irradiates the target object with the X-rays. The X-ray generator 110 receives power from a power supply (not shown) to generate the X-rays. Energy of the X-rays may be controlled according to an applied tube voltage, and intensity or dose of the X-rays may be controlled according to a tube current and an exposure time of the X-rays.

The X-ray generator 110 may emit monochromatic X-rays or polychromatic X-rays. According to an exemplary embodiment, the X-ray generator 110 emits polychromatic X-rays having a specific energy bandwidth and the energy bandwidth of the X-rays is defined by an upper limit and a lower limit thereof.

The upper limit of the energy band, that is, maximum energy of the emitted X-rays may be adjusted according to an amplitude of the tube voltage. The lower limit of the energy band, that is, minimum energy of the emitted X-rays may be adjusted according to a filter installed inside or outside the X-ray generator 110. When X-rays having a low energy bandwidth are filtered by the filter, average X-ray energy may be increased.

The X-ray detector 120 detects the X-rays having passed through the target object and converts the detected X-rays into X-ray data to acquire X-ray data.

In general, the X-ray detector 120 may be classified according to a composition method thereof, a method of converting detected X-rays into an electrical signal, and a method of acquiring the electrical signal. Hereinafter, various methods of detecting X-rays and converting the X-rays into an electrical signal to acquire X-ray data by the X-ray detector 120 will be described.

For example, the X-ray detector 120 may be classified into a detector including a monolithic type device and a detector including a hybrid type device according to a composition method thereof.

When the X-ray detector 120 includes the monolithic type device, a portion to detect X-rays to generate an electrical signal and a portion to read and process the electrical signal include semiconductors of the same material or are manufactured using the same process. For example, a light receiving device such as a charge coupled device (CCD) or a complementary metal oxide semiconductor (CMOS) may be used uniformly for detecting X-rays and reading and processing an electrical signal.

When the X-ray detector 120 includes the hybrid type device, a portion to detect X-rays to generate an electrical signal and a portion to read and process the electrical signal include respective different materials or are manufactured using different processes. For example, a light receiving device such as a photodiode, a CCD, CdZnTe, or the like detects X-rays and a read out integrated circuit (CMOS ROIC) reads and processes an electrical signal. For example, a strip detector detects X-rays and the CMOS ROIC reads and processes an electrical signal. Further, for example, an a-Si or a-Se flat panel system may be used.

In addition, the X-ray detector 120 may be classified into a direct conversion type and an indirect conversion type according to a method of converting X-rays into an electrical signal.

In the direct conversion type, when X-rays are emitted, electron-hole pairs are temporally generated, and electrons are moved to a positive electrode and holes are moved towards a negative electrode according to an electric field applied between opposite ends of a light receiving device. In this case, the X-ray detector 120 converts this movement of the electrons into an electrical signal. In the direct conversion type, the light receiving device may comprise a-Se, CdZnTe, $HgI_2$, $PbI_2$, or the like.

In the indirect conversion type, a scintillator is disposed between a light receiving device and the X-ray generator 110. Thus, when X-rays emitted from the X-ray generator 110 react with the scintillator to emit photons having a visible light wavelength, the light receiving device detects the photons and converts the photons into an electrical signal. In the indirect conversion type, the light receiving device may comprise a-Si or the like, and a thin film type GADOX scintillator, a micro column type scintillator, a needle structure type CSI (T1) scintillator, or the like may be used as the scintillator.

In addition, the X-ray detector 120 may be classified into a charge integration mode type, which stores electric charges for a predetermined period of time to acquire signals from the stored electrical charges, and a photon counting mode type, which counts photons having energy equal to or greater than threshold energy when a signal is generated by a single X-ray photon, according to a method of acquiring an electrical signal.

The X-ray imaging apparatus 100 according to an exemplary embodiment uses the photon counting mode which causes less X-ray exposure to a target object and less noise in an X-ray image than the charge integration mode. Thus, the X-ray detector 120 may be a photon counting detector (PCD).

Although the composition method and the method of conversion into an electrical signal of the X-ray detector 120 are not limited, it is assumed for convenience of explanation that an exemplary embodiment of the X-ray detector 120 uses a direct conversion method for directly acquiring an electrical signal from X-rays and includes a hybrid type in which a light receiving element for detecting X-rays and a read-out circuit chip are coupled.

Figure 2A:
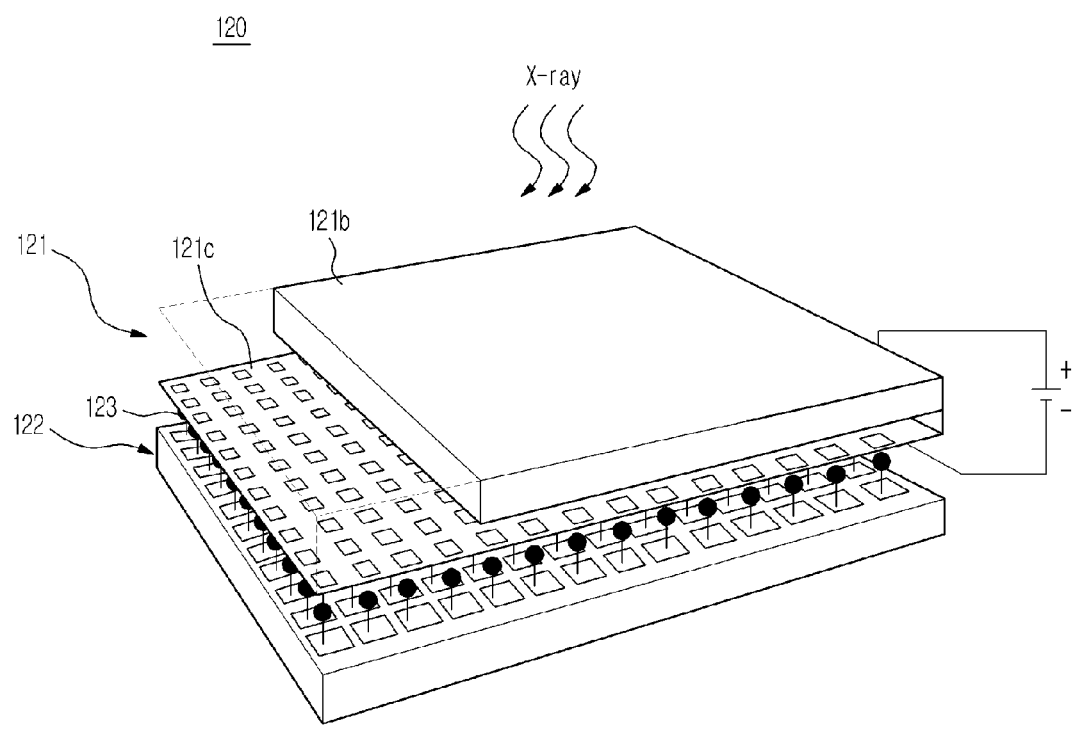
FIG. 2A is a schematic diagram of an X-ray detector of an X-ray imaging apparatus according to an exemplary embodiment.
Figure 2B:
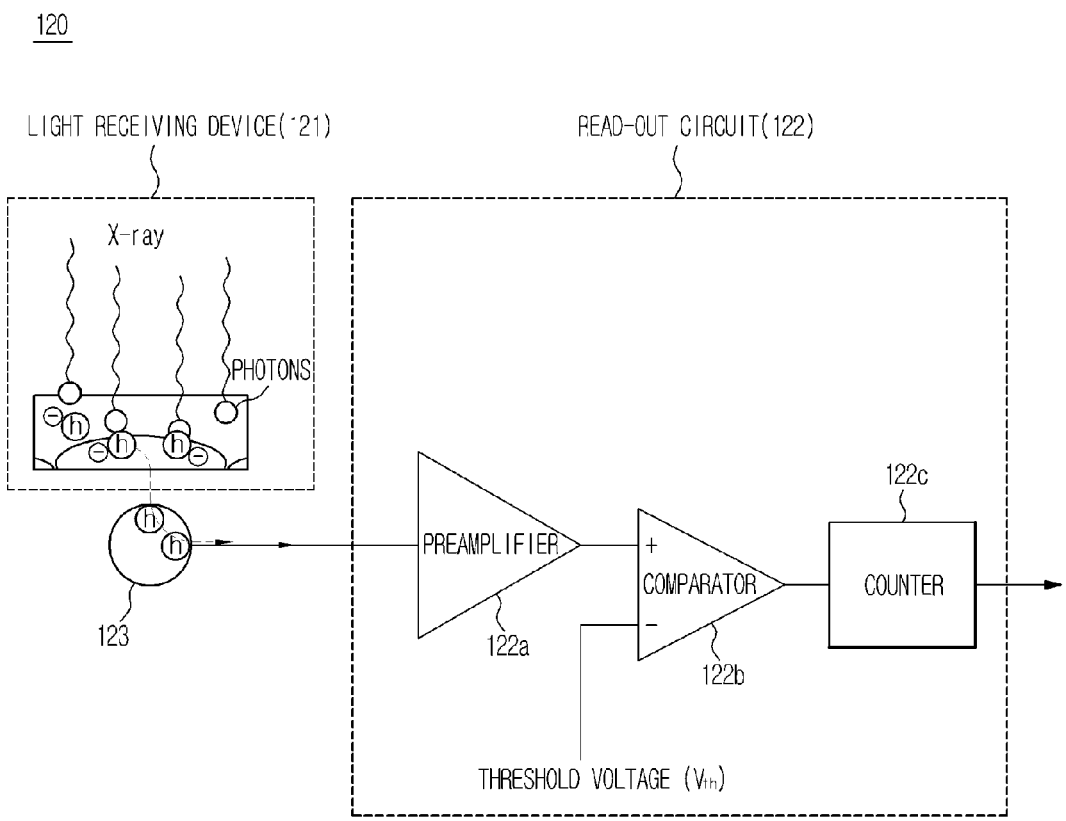
FIG. 2B is a schematic circuit diagram of a single pixel region of the X-ray detector shown in FIG. 2A.

FIG. 2A is a schematic diagram of the X-ray detector 120 of the X-ray imaging apparatus 100 according to an exemplary embodiment and FIG. 2B is a schematic circuit diagram of a single pixel region of the X-ray detector 120 shown in FIG. 2A.

Referring to FIG. 2A, the X-ray detector 120 includes a light receiving device 121 to detect X-rays and convert the detected X-rays into an electrical signal and a read-out circuit 122 to read the electrical signal. The read-out circuit 122 comprises a two-dimensional pixel array including a plurality of pixel regions. The light receiving device 121 may comprise a monocrystalline semiconductor material to achieve lower energy, higher resolution at lower dose, a quicker response time, and a higher dynamic region. The monocrystalline semiconductor material may be, for example, Ge, CdTe, CdZnTe, GaAs, or the like.

The light receiving device 121 may be in a PIN photodiode form by bonding a p-type layer 121c in which p-type semiconductors are arranged in a 2D pixel array form to a lower surface of a higher resistance n-type semiconductor substrate 121b. In addition, the read-out circuit 122 using a CMOS process is coupled to the light receiving device 121 for each respective pixel. The CMOS read-out circuit 122 and the light receiving device 121 may be bonded to each other via a flip chip bonding method. That is, the read-out circuit 122 and the light receiving device 121 may be bonded to each other by reflowing bumps 123 comprising PbSn, In, or the like and compressing the read-out circuit 122 and the light receiving device 121 to each other while applying heat thereto. However, the aforementioned structure of the X-ray detector 120 is merely an example and the disclosure is not limited thereto.

Referring to FIG. 2B, when photons of X-rays are incident upon the light receiving device 121, electrons in a valence band absorb energy of the photons which is equal to or greater than a band-gap energy difference and are excited to a conduction band. Accordingly, electron-hole pairs are generated in a depletion region.

A metal electrode is provided at each of the p-type layer 121c and the n-type semiconductor substrate 121b of the light receiving device 121. When a reverse bias is applied between metal electrodes, electrons of the electron-hole pairs generated in the depletion region are attracted toward an n-type region and holes thereof are attracted toward a p-type region. The holes attracted toward a p-type region are input to the read-out circuit 122 via the bumps 123 so that an electrical signal generated by photons may be read. However, it should be noted that electrons may be input to the read-out circuit 122 according to the structure of the light receiving device 121 and an applied voltage so that an electrical signal may be generated.

The read-out circuit 122 may comprise a two-dimensional pixel array corresponding to the p-type semiconductors of the light receiving device 121 and may read out an electrical signal for each respective pixel 50. When electric charges are input to the read-out circuit 122 from the light receiving device 121 via the bumps 123, a preamplifier 122a of the read-out circuit 122 is charged with an input electrical charge generated from a single photon and outputs a voltage signal corresponding thereto.

The voltage signal output from the preamplifier 122a is transmitted to a comparator 122b, the comparator 122b compares an externally controllable threshold voltage with the input voltage signal to output a pulse signal of '1' or '0' according to a comparison result, and a counter 122c counts an output number of '1' and outputs digitized X-ray data. The digitized X-ray data according to each pixel may be combined to acquire an X-ray image.

A threshold voltage corresponds to threshold energy. When counting the number of photons having energy that is equal to or greater than E, a threshold voltage corresponding to the threshold energy is input to the comparator 122b. The threshold voltage and the threshold energy may correspond to each other because an amplitude of the electrical signal (voltage) generated by the light receiving device 121 varies according to energy of photons. Thus, a desired threshold voltage corresponding to threshold energy may be calculated using an equation showing a relationship between energy of photons and generated voltage. Hereinafter, the term "threshold energy is input to the X-ray detector 120" is intended to mean that a threshold voltage corresponding to the threshold energy is input to the X-ray detector 120.

Figure 3:
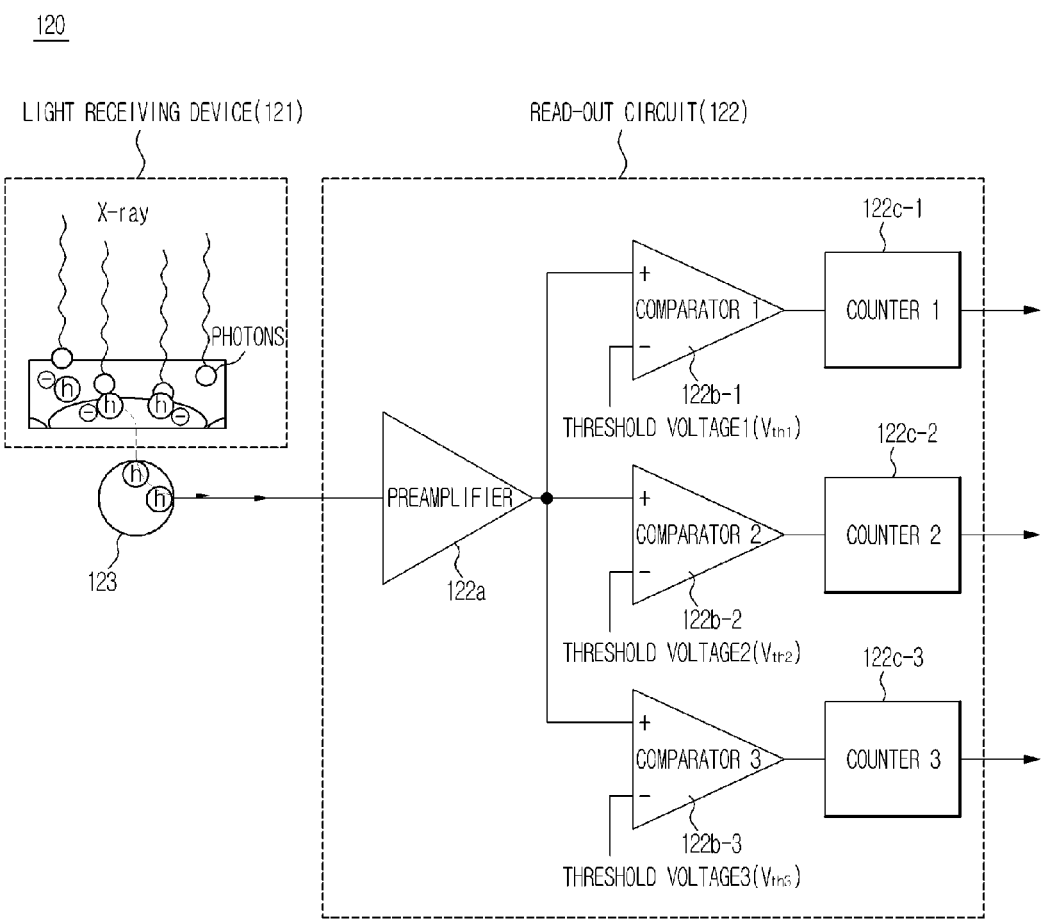
FIG. 3 is a schematic circuit diagram of a pixel region of an X-ray detector to divide X-rays according to a plurality of energy bands according to an exemplary embodiment.

FIG. 3 is a schematic circuit diagram of a pixel region of an X-ray detector 120 to divide X-rays according to a plurality of energy bands according to an exemplary embodiment.

To improve contrast between inner tissues of the target object 30, X-ray images having a plurality of different energy bands may be acquired to generate a multiple energy band X-ray image. To acquire the X-ray images having a plurality of different energy bands, X-rays may be emitted a plurality of times by varying energy bands of the X-rays. On the other hand, in an exemplary embodiment, a PCD is used as the X-ray detector 120 of the X-ray imaging apparatus 100 and thus the X-ray generator 110 emits X-rays once and the X-ray detector 120 sorts the detected X-rays according to the plurality of energy bands.

To this end, as shown in FIG. 3, a plurality of comparators (i.e., comparators 1, 2 and 3 122b-1, 122b-2 and 122b-3) and a plurality of counters (i.e., counters 1, 2 and 3 122c-1, 122c-2 and 122c-3) are installed to count photons according to a plurality of energy bands. Although the number of the comparators shown in FIG. 3 is three, the disclosure is not limited thereto. That is, the number of the comparators may be determined by the number of energy bands to be divided.

Referring to FIG. 3, when electrons or holes generated by a single photon are input to the preamplifier 122a to output a voltage signal, the voltage signal is input to the comparators 1, 2 and 3 122b-1, 122b-2 and 122b-3. When threshold voltages 1, 2 and 3 $V_{th1}$, $V_{th2}$ and $V_{th3}$ are respectively input to the comparators 1, 2 and 3 122b-1, 122b-2 and 122b-3, the comparator 1 122b-1 compares the input voltage with the threshold voltage 1 $V_{th1}$ and the counter 1 122c-1 counts the number of photons generating a voltage that is equal to or greater than the threshold voltage 1 $V_{th1}$. In the same manner, the counter 2 122c-2 counts the number of photons generating a voltage that is equal to or greater than the threshold voltage 2 $V_{th2}$, and the counter 3 122c-3 counts the number of photons generating a voltage that is equal to or greater than the threshold voltage 3 $V_{th3}$.

Figure 4A:
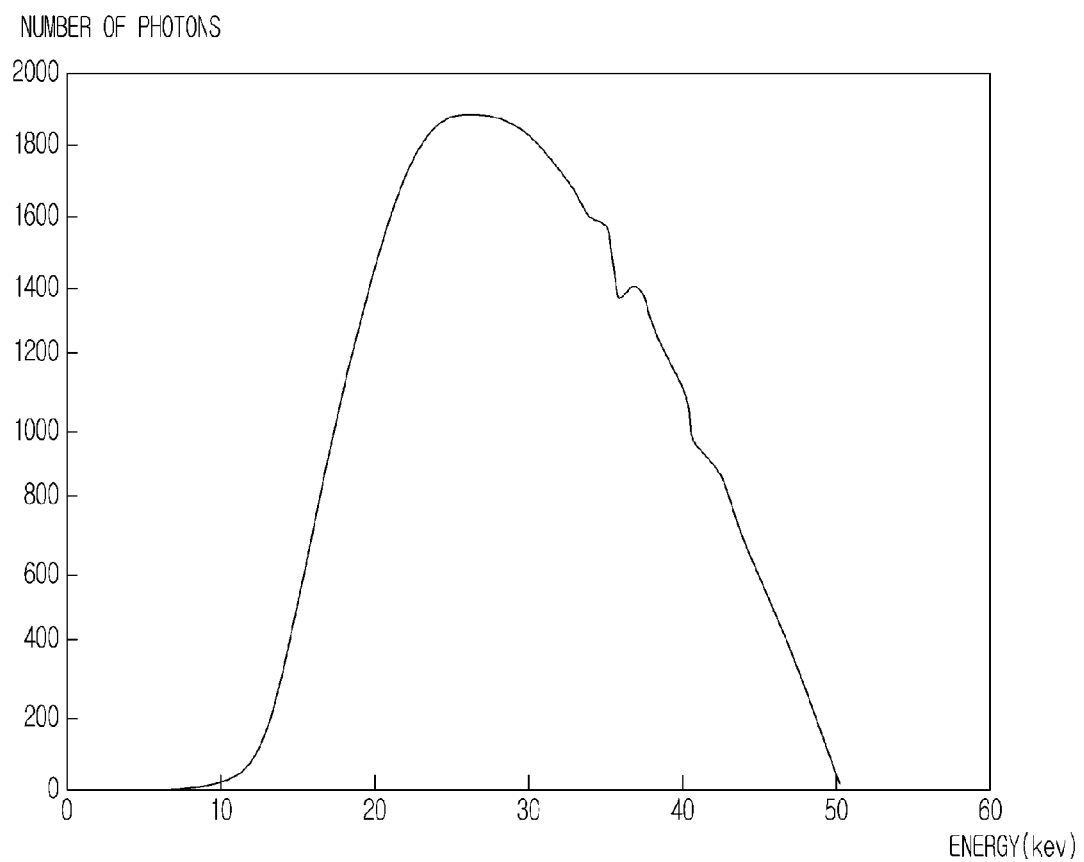
FIG. 4A is a graph showing an energy spectrum of X-rays emitted by an X-ray generator according to an exemplary embodiment.
Figure 4B:
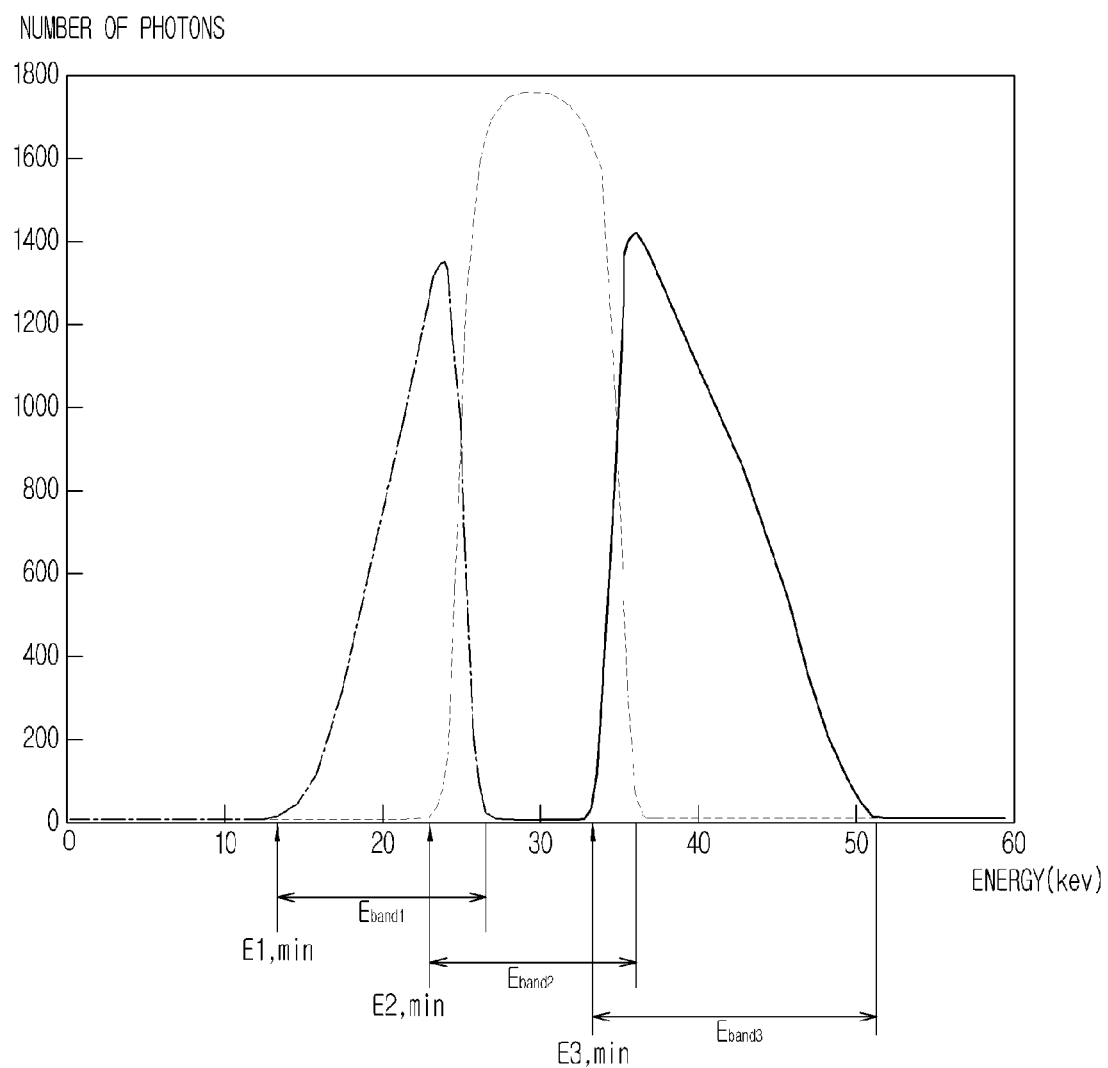
FIG. 4B is a graph showing an ideal spectrum in a case in which an X-ray detector divides the energy spectrum of the X-rays shown in FIG. 4A according to energy bands.

FIG. 4A is a graph showing an energy spectrum of X-rays emitted by the X-ray generator 110 according to an exemplary embodiment and FIG. 4B is a graph showing an ideal spectrum in a case in which the X-ray detector 120 divides the energy spectrum of the X-rays shown in FIG. 4A according to energy bands.

The energy of X-rays emitted by the X-ray generator 110 is adaptively controlled according to a target object. Thus, when the target object is a breast, as shown in FIG. 4A, the X-ray generator 110 may generate X-rays having an energy lower limit of about 10 keV and an energy upper limit of about 50 keV and irradiate the target object with the generated X-rays. To this end, the X-rays may be generated at a tube voltage of 50 kVp and emitted after filtering a low energy band thereof (i.e., about 0 to about 10 keV). Here, an X-ray dose (number of photons) represented by a Y-axis of the graph shown in FIG. 4A may be controlled by a tube current and an X-ray exposure time.

X-rays detected by the X-ray detector 120 may be divided according to three energy bands $E_{band1}$, $E_{band2}$ and $E_{band3}$, as shown in FIG. 4B. To this end, a voltage corresponding to $E_{1,min}$ may be calculated and input as a threshold voltage to the comparator 1 122b-1 of FIG. 3, a voltage corresponding to $E_{2,min}$ may be calculated and input as a threshold voltage to the comparator 2 122b-2, and a voltage corresponding to $E_{3,min}$ may be calculated and input as a threshold voltage to the comparator 3 122b-3.

Theoretically, an amplitude of a voltage signal generated by each pixel of the X-ray detector 120 is affected only by energy of emitted photons. However, in real applications, but the amplitude of the voltage signal may also be affected by the characteristics of the light receiving device 121 or the readout circuit 122 of each pixel. Thus, when photons having the same energy are incident upon all the pixels, the amplitude of a voltage signal generated by a single photon may vary according to each pixel.

For example, when a threshold voltage corresponding to threshold energy is input to a comparator in order to count only photons having energy equal to or greater than the threshold energy, errors may occur in signals input to or output from a preamplifier, and thus, errors may occur in X-ray data to be output from a counter.

Thus, the controller 130 extracts corrected threshold energy to which errors according to the characteristics of respective pixels are reflected to generate a map and calculates X-ray data corresponding to the corrected threshold energy which is mapped to the respective pixels using X-ray data acquired by photographing an actual target object. Hereinafter, an operation of the controller 130 will be described in detail.

X-ray data indicates information regarding the number of photons (or X-ray intensity) counted by the X-ray detector 120. An X-ray image indicates information regarding a degree by which X-rays emitted from the X-ray generator 110 is attenuated while passing through a target object. Thus, X-ray data to be used for generation of the X-ray image may be normalized X-ray intensity, and thus, X-ray data used by the controller 130 may be the normalized X-ray intensity. The normalized X-ray intensity is a ratio of X-ray intensity $I_0$ (see FIG. 5) measured without a target object, that is, X-ray intensity emitted to the target object to X-ray intensity I (see FIG. 5) having passed through the target object, and here, the X-ray intensity $I_0$ and the X-ray intensity I are measured under the same conditions.

Figure 5:
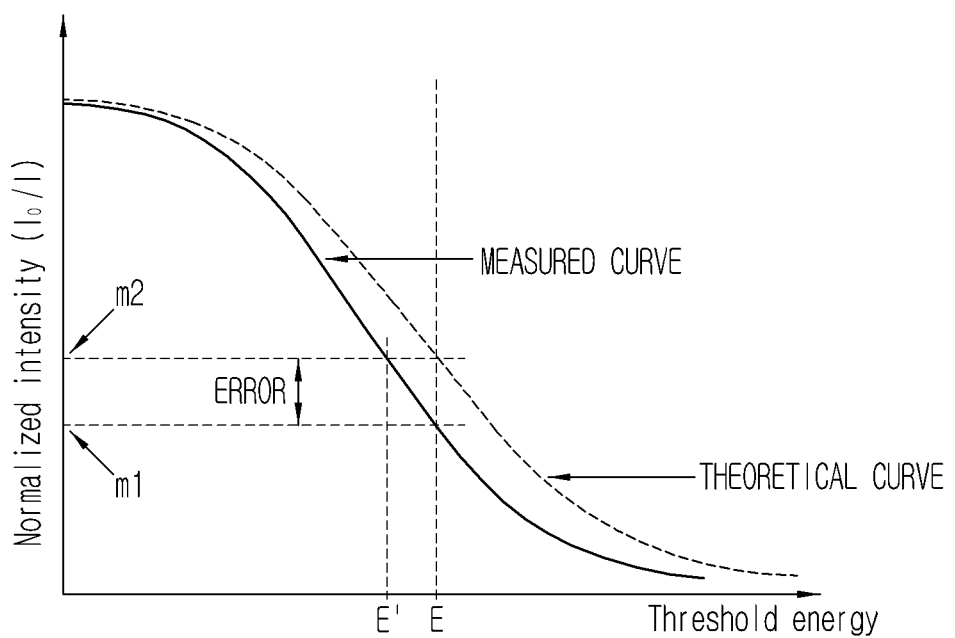
FIG. 5 is a graph showing a measured X-ray intensity normalized for each threshold energy.
Figure 6:
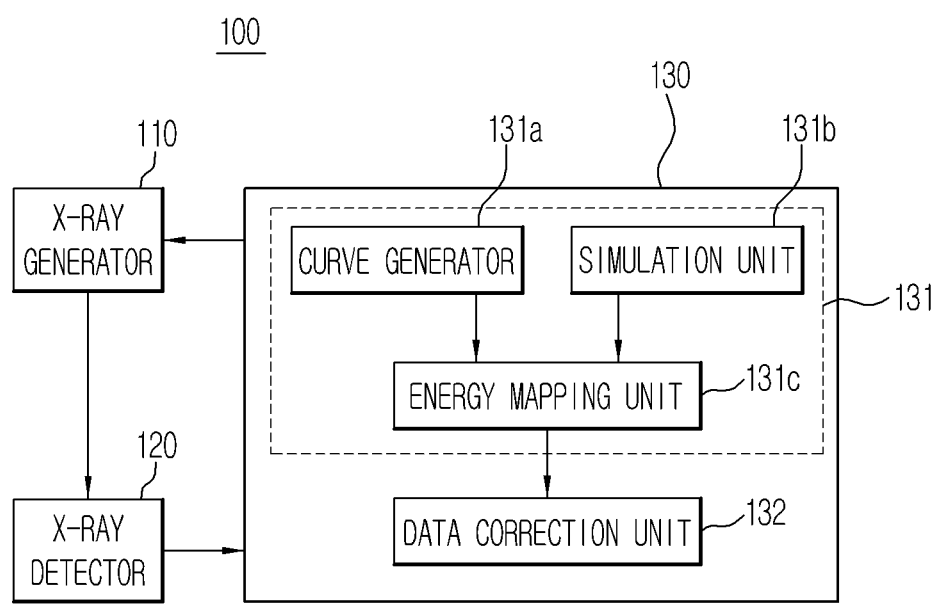
FIG. 6 is a block diagram of a controller of an X-ray imaging apparatus according to an exemplary embodiment.

FIG. 5 is a graph showing a measured X-ray intensity normalized for each threshold energy and FIG. 6 is a block diagram of the controller 130 of an X-ray imaging apparatus according to an exemplary embodiment. The graph shown in FIG. 5 is shown with respect to a single pixel.

Referring to FIG. 5, an error may occur between normalized X-ray intensity ($I_0/I$) measured for varying threshold energy and a theoretical value of normalized X-ray intensity according to characteristics of pixels.

For example, when a value of threshold energy to be input is E, that is, when the number of photons having energy that is equal to or greater than threshold energy E is counted, theoretical normalized X-ray intensity with respect to threshold energy of E is $m_2$. When a threshold energy level of E is actually input, however, measured normalized X-ray intensity may be $m_1$.

By comparing the curve of measured normalized X-ray intensity with the theoretical curve of normalized X-ray intensity, it can be known that a threshold energy level of E' needs to be input to acquire the threshold normalized X-ray intensity of $m_2$ corresponding to the threshold energy level of E or higher for the same pixel through the X-ray detector 120.

Hereinafter, for convenience of description, actual threshold energy E will be referred to as target threshold energy and threshold energy E' for acquiring theoretical normalized X-ray intensity corresponding to the target threshold energy via the X-ray detector 120 will be referred to as corrected threshold energy.

Pixels have different characteristics, and thus, corrected threshold energy may also differ per pixel. Input of different threshold energies according to pixels is inefficient because the complexity of a circuit may be increased and errors may occur. Thus, the controller 130 calculates X-ray data corresponding to the corrected threshold energy to be input to each pixel of the X-ray detector 120 using X-ray data acquired via the X-ray detector 120, which will be described in detail with reference to FIG. 6.

Referring to FIG. 6, the controller 130 includes a map generator 131 to extract corrected threshold energy for each pixel and generate an energy map and a data correction unit 132 to calculate corrected X-ray data corresponding to corrected threshold energy during actual photography of a target object.

In addition, the map generator 131 includes a curve generator 131a to generate a curve of a normalized X-ray intensity measured with respect to a predesigned phantom while threshold energy varies, a simulation unit 131b to calculate a theoretical normalized X-ray intensity under the same conditions, and an energy mapping unit 131c to extract threshold energy corresponding to the theoretical normalized X-ray intensity on a curve of the measured normalized X-ray intensity and to map the threshold energy to a corresponding pixel.

The curve generator 131a generates the normalized X-ray intensity curve per pixel using a plurality of normalized X-ray intensities that are measured with respect to the predesigned phantom while threshold energy varies. Errors of output values according to the characteristics of pixels are reflected to the curve generated per pixel. The phantom may be designed to have substantially uniform thickness and substantially uniform material composition among all pixels.

The simulation unit 131b calculates the theoretical normalized X-ray intensity under the same conditions as the case in which the normalized X-ray intensity is measured with respect to the phantom. The condition may include the thickness and the material composition of the phantom and may further include any condition which influences the normalized X-ray intensity as well as the characteristics of the light receiving device 121 of the X-ray detector 120 and the characteristic of a circuit.

In an exemplary embodiment, the theoretical normalized X-ray intensity may be calculated while threshold energy is varied, that is, as shown in FIG. 5, the theoretical normalized X-ray intensity curve may be generated. Alternatively, the theoretical normalized X-ray intensity may be generated with respect to only at least one target threshold energy to be applied to actual photography.

Figure 7:
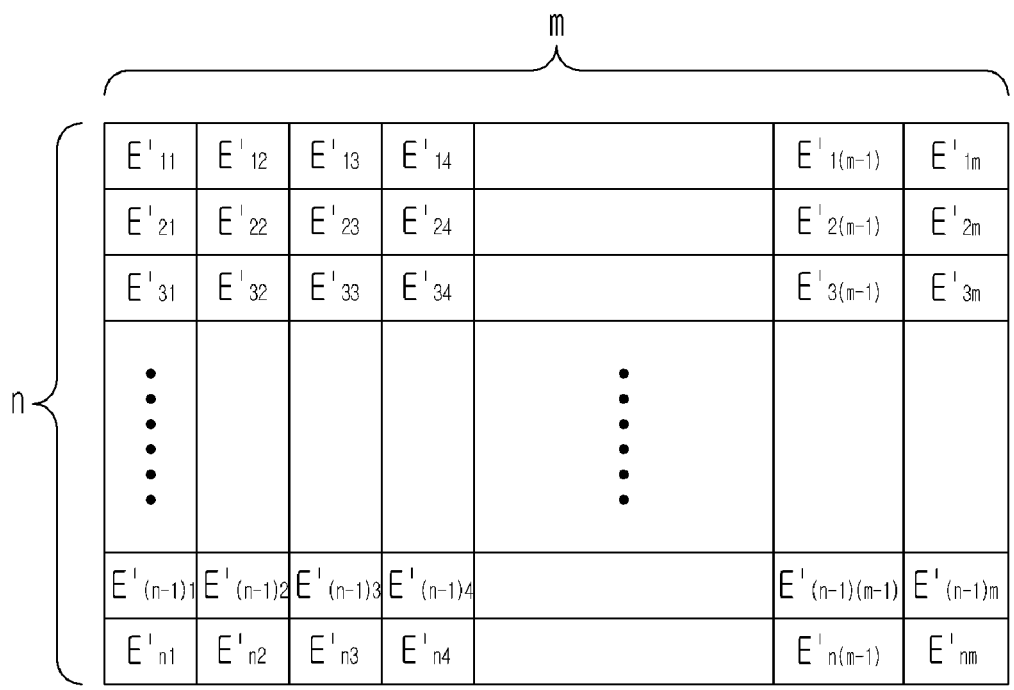
FIG. 7 is a view illustrating an energy map generated by a controller an X-ray imaging apparatus according to an exemplary embodiment.

FIG. 7 is a view illustrating an energy map generated by a controller of an X-ray imaging apparatus according to an exemplary embodiment. Hereinafter, an operation of the energy mapping unit 131c will be described with reference to FIG. 7.

The energy mapping unit 131c extracts the normalized X-ray intensity corresponding to the target threshold energy from the simulation unit 131b and extracts the corrected threshold energy corresponding to the extracted normalized X-ray intensity from the curve generated by the curve generator 131a to map the corrected threshold energy to pixels. Referring to FIG. 7, when the X-ray detector 120 includes m×n pixels (m and n are integers larger than 1), corrected threshold energies $E'_{11}$ through $E'_{nm}$ for obtaining the theoretical normalized X-ray intensity corresponding to the target threshold energy are extracted for each pixel and mapped to corresponding pixels.

FIG. 7 shows a case in which one set of corrected threshold energy is mapped per pixel. However, as shown in FIG. 3, when the X-ray imaging apparatus 100 divides detected X-rays according to a plurality of energy bands, a plurality of sets of corrected threshold energies for dividing the detected X-rays may be mapped per pixel.

The operation of the map generator 131, which has been described above, may be performed to map the corrected threshold energy to each pixel in advance, and may be performed before the X-ray imaging apparatus 100 is used, may be periodically performed, may be performed when the X-ray imaging apparatus 100 is initialized, or may be performed whenever the target threshold energy is changed. In an exemplary embodiment, the X-ray imaging apparatus 100 may be provided with a database (not shown) for storing a table as shown in FIG. 7 in which corrected threshold energy for obtaining X-ray data corresponding to target threshold energy is mapped per each pixel. In this case, the controller 130 may refer to the database to obtain the corrected threshold energy mapped to each pixel, and thus, the controller 130 may not include the map generator 131.

The data correction unit 132 calculates corrected X-ray data corresponding to the corrected threshold energy for each pixel from a plurality of X-ray data acquired by inputting a plurality of approximate energies to threshold energy during actual photography of a target object. The corrected X-ray data calculated for each pixel may be combined to generate an image of the target objet, errors of which are corrected. Here, the approximate energy refers to energy that is equal or approximate to the target threshold energy.

Figure 8:
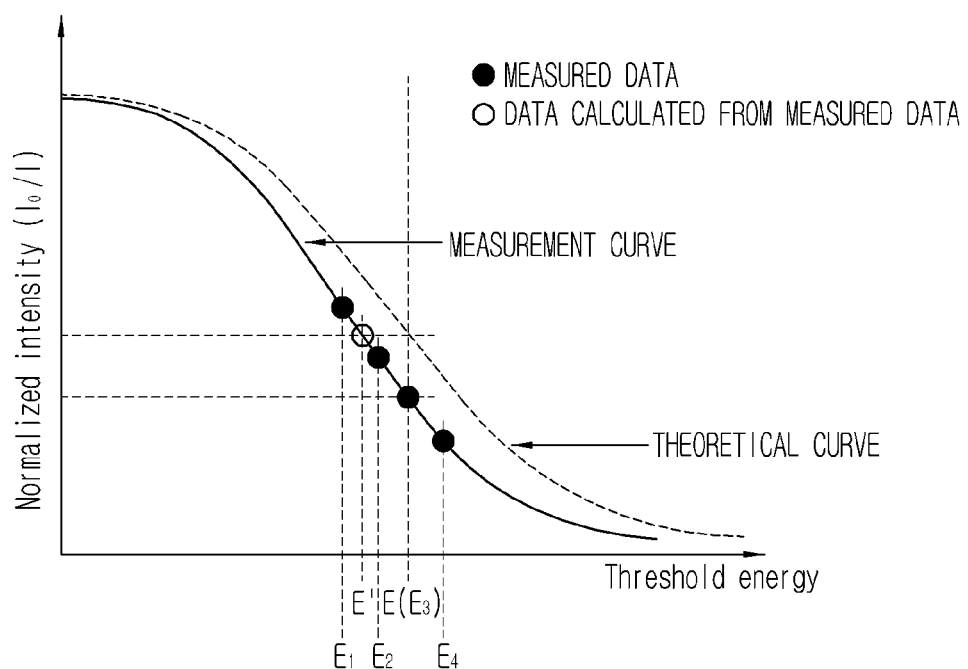
FIG. 8 is a graph for explaining an operation of generating an image of a target object by an image generator of an X-ray imaging apparatus according to an exemplary embodiment.

FIG. 8 is a graph for explaining an operation of calculating corrected X-ray data by a data correction unit of an X-ray imaging apparatus according to an exemplary embodiment.

Referring to FIG. 8, the X-ray imaging apparatus 100 inputs at least two approximate energies that are equal or approximate to target threshold energy E with respect to all pixels during actual photography of a target object to acquire at least two images of a target object. In a case shown in FIG. 8, four approximate energies $E_1$, $E_2$, $E_3$, and $E_4$ are input as threshold energy, and thus, four images of the target object may be acquired. As shown in FIG. 8, a plurality of approximate energies includes $E_3$ which is equal to the target threshold energy E. However, this is merely an example and the plurality of approximate energies may not include the target threshold energy E.

The corrected threshold energy mapped by the map generator 131 may differ per pixel. Here, performing photography with respect to correct threshold energy of all pixels during actual photography of the target object may be restrictive in terms of operation time such that X-ray exposure time of the target object may be excessively increased. Thus, the X-ray imaging apparatus 100 inputs a smaller number of approximate energies that are equal or approximate to the target threshold energy as the threshold energy to acquire a smaller number of images of the target object and calculates corrected X-ray data corresponding to the corrected threshold energy. As described above, X-ray data may be normalized X-ray intensity.

For example, as shown in FIG. 8, the images of the target object may be acquired with respect to four approximate energies by inputting approximate energy 1($E_1$) as threshold energy to photograph the target object, by inputting approximate energy 2($E_2$) as threshold energy to photograph the target object, by inputting approximate energy 3($E_3$) as threshold energy to photograph the target object, and by inputting approximate energy 4($E_4$) as threshold energy to photograph the target object. An image of the target object includes pixel values, and the pixel values contain X-ray data. Thus, by acquiring the image of the target object, the X-ray data may be acquired.

In addition, the data correction unit 132 may calculate corrected X-ray data corresponding to corrected threshold energy per pixel using at least one of various methods of estimating data such as, for example, interpolation, curve fitting, and weighted sum.

When interpolation is used, threshold energies (input values $E_1$, $E_2$, $E_3$, and $E_4$) input during photography of the target object and normalized X-ray intensities (function values $f(E_1)$, $f(E_2)$, $f(E_3)$, and $f(E_4)$) of a single pixel, measured with respect thereto, are extracted from the acquired image of the target object to estimate a function ($f(E)$) by which a relationship between the threshold energies and the normalized X-ray intensities is correctly represented. In addition, the normalized X-ray intensities corresponding to the corrected threshold energy are calculated by inserting the corrected threshold energy mapped to a corresponding pixel to the estimated function. The data correction unit 132 may perform the aforementioned operation on all pixels to generate an image, errors of which are corrected according to the characteristics of pixels.

When curve fitting is used, a function ($f(E)$) is estimated such that the relationship between the threshold energies (input values $E_1$, $E_2$, $E_3$, and $E_4$) and the normalized X-ray intensities (function values $f(E_1)$, $f(E_2)$, $f(E_3)$, and $f(E_4)$) of a single pixel, measured with respect thereto, may be correctly represented most approximately under a limited condition. A representative example of a method of estimating the function (f(E)) is a least-squares regression. In addition, corrected threshold energy mapped to a corresponding pixel is inserted to the estimated function to calculate normalized X-ray intensity corresponding to the corrected threshold energy. The data correction unit 132 may perform the aforementioned operation on all pixels to generate an image, errors of which are corrected according to the characteristics of pixels.

When weighted sum is used, the normalized X-ray intensities (function values $f((E_1), f(E_2), f(E_3),$ and $f(E_4)$) of a single pixel, measured with respect to the threshold energies (input values $E_1, E_2, E_3,$ and $E_4$), are multiplied by appropriate weights and then result values are added to calculate normalized X-ray intensity corresponding to the corrected threshold energy. The data correction unit 132 may perform the aforementioned operation on all pixels to generate an image, errors of which are corrected according to the characteristics of pixels.

As shown in FIG. 3, when a single pixel includes a plurality of comparison circuits (including a comparer and a counter), the map generator 131 may generate an energy map with respect to each comparison circuit of the pixel and the data correction unit 132 may calculate normalized X-ray intensity corresponding to corrected threshold energy from X-ray data output from each comparison circuit.

Figure 9:
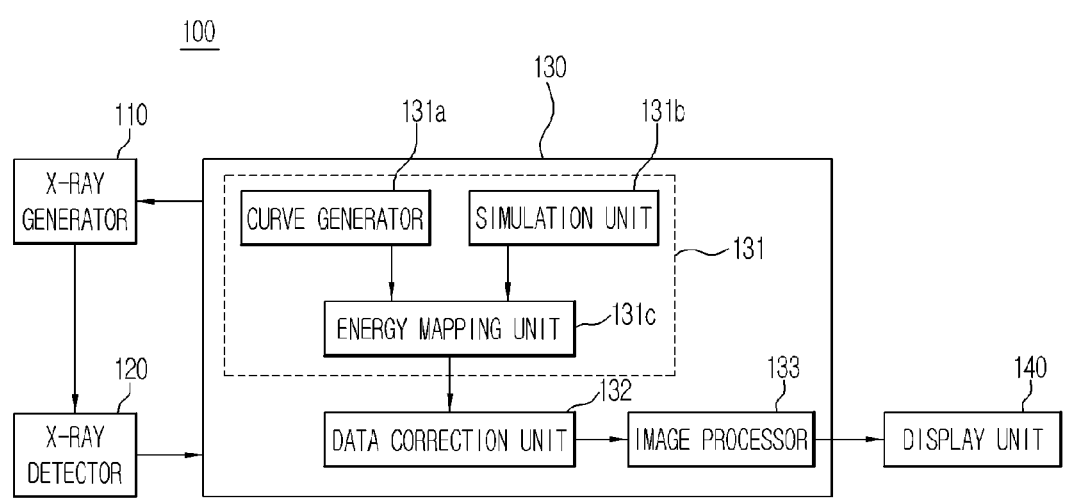
FIG. 9 is a block diagram of an X-ray imaging apparatus according to another exemplary embodiment.

FIG. 9 is a block diagram of an X-ray imaging apparatus 100 according to another exemplary embodiment.

Referring to FIG. 9, the X-ray imaging apparatus 100 may further include a display unit 140 to display an image of a target object, which is generated by the controller 130. The controller 130 may include an image processor 133 to process the image of the target object, which is generated by the controller 130, to generate an image to be displayed on the display unit 140.

The image processor 133 may perform further processes for improving image quality. When a single pixel of the X-ray detector 120 includes a plurality of comparison circuits, the image processor 133 may generate a multi-energy X-ray image with improved contrast between inner tissues of the target object using images according to energy bands, which is generated by the data correction unit 132.

Figure 10:
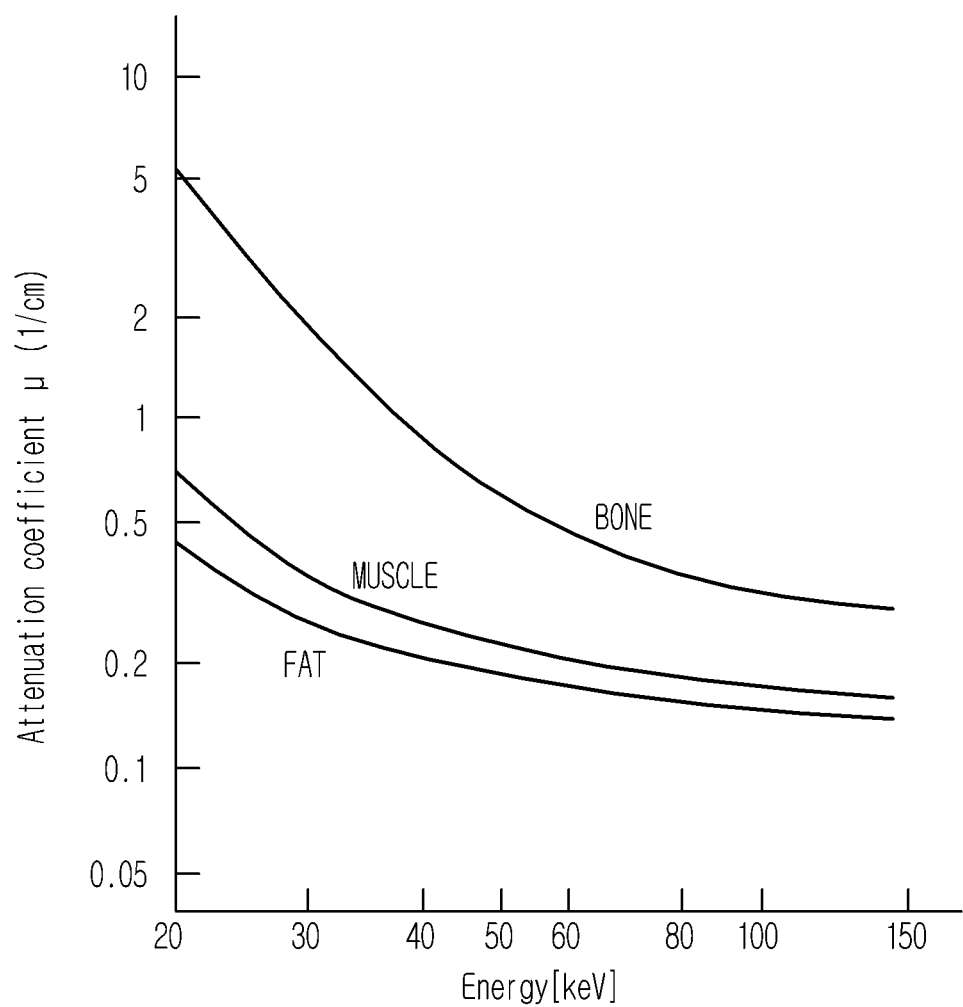
FIG. 10 is a graph showing variation in an X-ray attenuation coefficient according to materials constituting a human body.

FIG. 10 is a graph showing variation in X-ray attenuation coefficient according to materials constituting a human body.

As described above, X-ray permeability may differ according to the characteristics of materials through which X-rays pass, which may be quantitatively represented as an attenuation coefficient.

FIG. 10 shows curves indicating a variation in an X-ray attenuation coefficient according to X-ray energy with respect to bone, muscle, and fat among materials constituting a human body. As shown in FIG. 10, the variation in X-ray attenuation coefficient differs with respect to bone, muscle, and fat, and a difference in X-ray attenuation coefficients for the respective materials differs according to X-ray energy.

FIG. 10 shows variation in X-ray attenuation coefficient according to X-ray energy with respect to pure bone, muscle, and fat. However, variation in an X-ray attenuation coefficient differs between various soft tissues including fat. In particular, with regard to the breast, variation in an X-ray attenuation coefficient differs between adipose tissues and parenchyma. Thus, materials having different attenuation characteristics may be extracted from one image using a plurality of image signals according to different energy bands.

The multiple-energy X-ray image generated by the image processor 133 may be at least one image separated per material or may be a characteristic image indicating the image separated per material. The characteristic image may be used to distinguish between a plurality of materials in one image via color mapping, brightness adjustment, or the like.

In addition, the multiple-energy X-ray image generated by the image processor 133 may be displayed through the display unit 140.

Hereinafter, a method of controlling an X-ray imaging apparatus will be described with regard to an exemplary embodiment.

Figure 11:
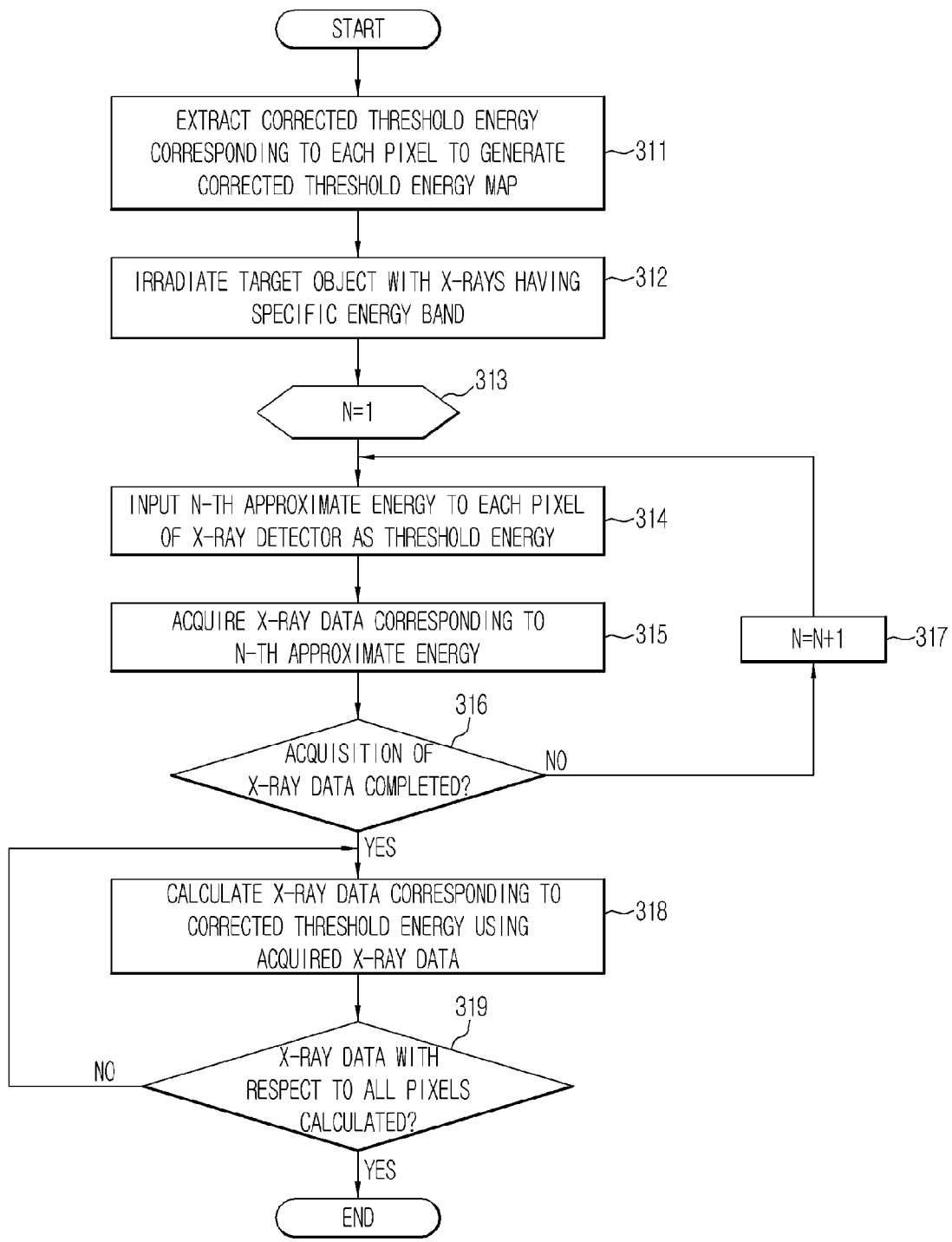
FIG. 11 is a flowchart illustrating a method of controlling an X-ray image apparatus according to an exemplary embodiment.

FIG. 11 is a flowchart illustrating a method of controlling an X-ray image apparatus according to an exemplary embodiment.

Referring to FIG. 11, corrected threshold energy for each pixel of an X-ray detector is extracted to generate an energy map (311). The corrected threshold energy refers to threshold energy that needs to be input to each pixel of the X-ray detector in order to output theoretical X-ray data corresponding to target threshold energy. The corrected threshold energy may differ according to the characteristics of a light receiving device and a read-out circuit for each pixel. A method of generating an energy map will be described in detail with reference to FIG. 12.

The generation of the energy map may be performed in advance before the target object is actually photographed, may be performed when an X-ray imaging apparatus is initialized, may be performed when target threshold energy is changed, or may be performed at a specific frequency.

In addition, an image of the target objet, errors of which are corrected according to the characteristics of pixels, is generated using the energy map during actual photography of the target object. To this end, the target object is irradiated with X-rays having a specific energy band (312) and first approximate energy (N=1) that is equal or approximate to the target threshold energy is input to each pixel of the X-ray detector 120 as threshold energy (313 and 314). In this case, the energy band of the emitted X-rays may differ according to the type or thickness of the target object. For example, when the target object is a breast, the emitted X-rays may have an energy band of about 10 to about 50 keV. When the target object is a chest, the emitted X-rays may have an energy band of about 10 to about 140 keV.

Then, X-ray data corresponding to the first approximate energy (N=1) is acquired (315). The X-ray data corresponding to the first approximate energy may be data including information regarding the number of photons of X-rays (intensity of X-rays) detected by the X-ray detector as having energy equal to or greater than the first approximate energy. For example the X-ray data may be normalized X-ray intensity having energy equal to or greater than the first approximate energy.

Emission of X-rays and acquisition of X-ray data are performed with respect to a plurality of approximate energies. The number and intensity of the approximate energies may be set based on data correction accuracy of an X-ray imaging apparatus, X-ray exposure of the target object, or user settings.

When the acquisition of the X-rays is not completed (NO to operation 316), in addition to the first approximate energy 1, second approximate energy (N=2) is input as threshold energy (317) to reacquire X-ray data.

When the acquisition of the X-ray is completed (YES to operation 316), corrected X-ray data corresponding to the corrected threshold energy is calculated using the acquired X-rays (318). In detail, the corrected X-ray data corresponding to the corrected threshold energy may be calculated using at least one of various methods of estimating data such as interpolation, curve fitting, and weighted sum. The calculation of the corrected X-ray data has been described in detail with regard to the above exemplary embodiments of the X-ray imaging apparatus 100, and thus, a detailed thereof is omitted herein.

The corrected threshold energy is mapped per pixel, and thus, the corrected X-ray data is calculated per pixel. When the corrected X-ray data is calculated with respect to all pixels (YES to operation 319), the corrected X-ray data with respect to all pixels is combined to generate one image, errors of which are corrected according to the characteristics of each pixel.

Figure 12:
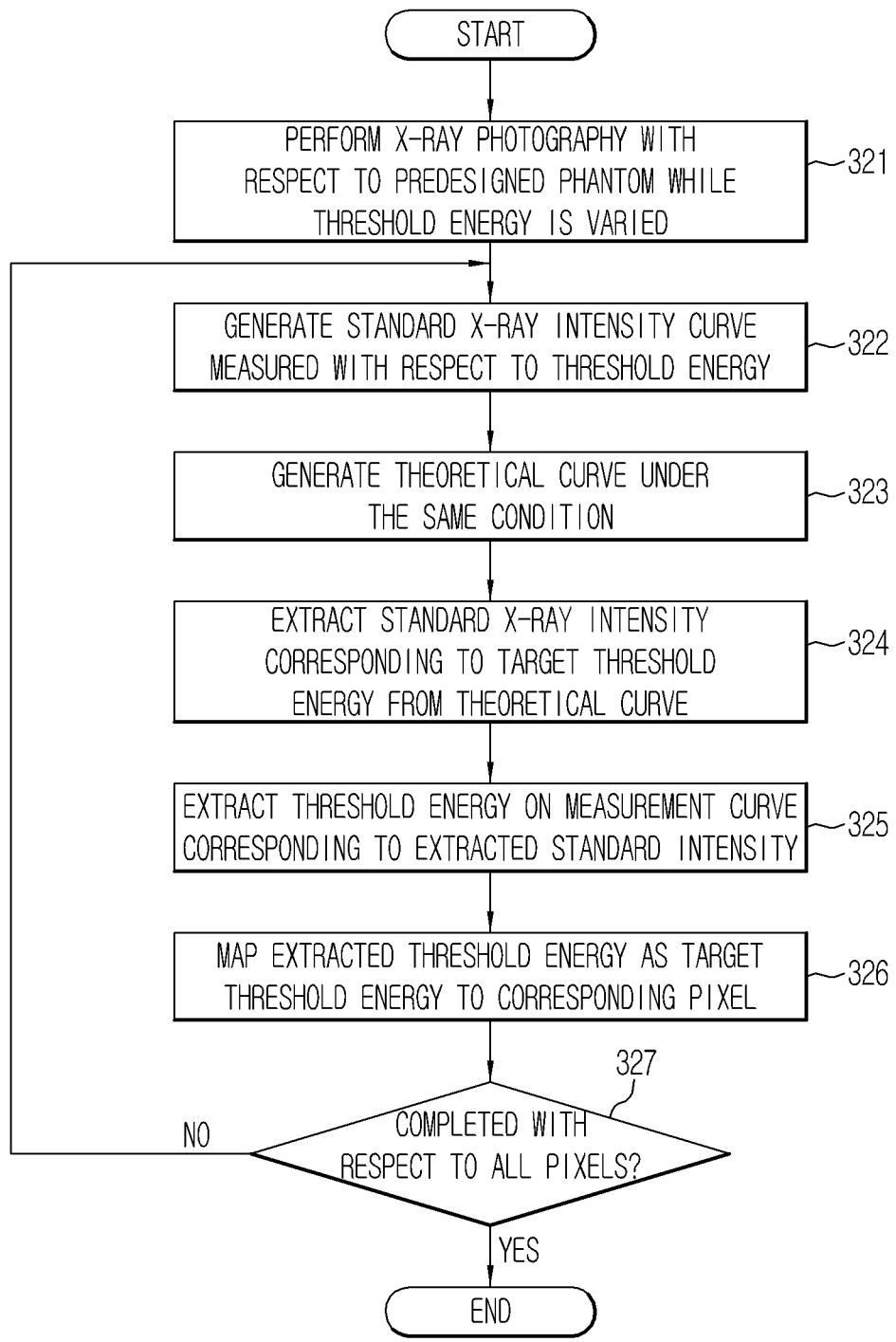
FIG. 12 is a flowchart illustrating a method of generating an energy map in a method of controlling an X-ray imaging apparatus according to an exemplary embodiment.

FIG. 12 is a flowchart illustrating a method of generating an energy map in a method of controlling an X-ray imaging apparatus according to an exemplary embodiment. The exemplary embodiment of FIG. 12 will be described when X-ray data corresponds to normalized X-ray intensity.

Referring to FIG. 12, the normalized X-ray intensity is measured with respect to a predesigned phantom while threshold energy is varied (321). The phantom may be designed to have substantially uniform thickness and substantially uniform material composition among all pixels.

A normalized X-ray intensity curve measured with respect to threshold energy is generated (322) and a theoretical curve under the same conditions is generated (323). In this case, theoretical normalized X-ray intensity may be generated with respect to at least one target threshold energy used during actual photography. The condition may include the thickness and the material composition of the phantom and may include any condition which influences the normalized X-ray intensity as well as the characteristics of the light receiving device 121 of the X-ray detector 120 and the characteristic of the read-out circuit 122 thereof. Both a measurement curve and a theoretical curve are generated with respect to a single pixel.

The normalized X-ray intensity corresponding to the target threshold energy is extracted from the theoretical curve (324) and threshold energy on the measurement curve, which corresponds to the extracted normalized X-ray intensity, is extracted (325). The extracted threshold energy is corrected threshold energy.

Thus, when the extracted threshold energy is mapped to a corresponding pixel (326) and operations 322 to 326 are performed on all pixels (YES to operation 327), the generation of the energy map is completed.

As is apparent from the above description, an X-ray imaging apparatus and a method of controlling the same according to exemplary embodiments may map corrected threshold energy in consideration of the characteristics of a light receiving device or read-out circuit per pixel of an X-ray detector and may calculate data corresponding to the mapped corrected threshold energy based on data acquired by actual photography of a target object, and thus, may correct errors according to the characteristics of respective pixels.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An X-ray imaging apparatus comprising:
an X-ray generator configured to generate and emit X-rays;
an X-ray detector configured to detect the X-rays and count a number of photons having energy equal to or greater than threshold energy of the X-ray detector, per pixel, among photons contained in the detected X-rays; and
a controller configured to:
extract corrected threshold energy corresponding to target threshold energy mapped to each pixel, and
calculate corrected X-ray data corresponding to the corrected threshold energy per pixel from a plurality of X-ray data acquired based on a plurality of images of a target object obtained by using a plurality of approximate energies equal or approximate to the target threshold energy as the threshold energy of the X-ray detector.

2. The X-ray imaging apparatus according to claim 1, wherein the controller is further configured to generate a curve of the X-ray data relative to varying threshold energy measured per pixel with respect to a predesigned phantom.

3. The X-ray imaging apparatus according to claim 2, wherein the controller is further configured to calculate theoretical X-ray data corresponding to the target threshold energy per pixel under the same conditions as conditions of measurement of the X-ray data.

4. The X-ray imaging apparatus according to claim 3, wherein the controller is further configured to extract threshold energy for obtaining the theoretical X-ray data corresponding to the target threshold energy from the curve of the measured X-ray data and map the extracted threshold energy as the corrected threshold energy to a corresponding pixel.

5. The X-ray imaging apparatus according to claim 4, wherein the X-ray data is represented by a ratio of intensity of X-rays emitted to the predesigned phantom and intensity of X-rays having passed through the predesigned phantom.

6. The X-ray imaging apparatus according to claim 1, wherein the controller is further configured to calculate the corrected X-ray data corresponding to the corrected threshold energy per pixel using at least one of interpolation, curve fitting, and weighted sum.

7. The X-ray imaging apparatus according to claim 6, wherein the controller is further configured to estimate a function representing a relationship between the threshold energy and the X-ray data from the plurality of images of the target object obtained by using the plurality of approximate energies as the threshold energy and insert the corrected threshold energy into the estimated function to calculate corrected X-ray data.

8. The X-ray imaging apparatus according to claim 6, wherein the controller is further configured to apply weights to X-ray data respectively acquired by using the plurality of approximate energies as the threshold energy and calculate the corrected X-ray data based on the weight applied X-ray data.

9. The X-ray imaging apparatus according to claim 6, wherein the X-ray data is represented by a ratio of intensity of X-rays emitted to the target object and intensity of X-rays passing through the target object.

10. A method of controlling an X-ray imaging apparatus comprising a photon counting detector (PCD), the method comprising:
acquiring corrected threshold energy corresponding to target threshold energy per pixel of the PCD and mapping the corrected threshold energy to a corresponding pixel;
obtaining a plurality of images of a target object by using a plurality of approximate energies equal or approximate to the target threshold energy as threshold energy of the PCD; and
calculating corrected X-ray data corresponding to the corrected threshold energy per pixel from a plurality of X-ray data acquired based on the plurality of images of the target object.

11. The method according to claim 10, wherein the acquiring comprises generating a curve of the X-ray data relative to varying threshold energy measured per pixel with respect to a predesigned phantom.

12. The method according to claim 11, wherein the acquiring further comprises calculating theoretical X-ray data corresponding to the target threshold energy per pixel under the same condition as a condition of measurement of the X-ray data.

13. The method according to claim 12, wherein the acquiring further comprises extracting threshold energy for obtaining the theoretical X-ray data corresponding to the target threshold energy from the curve of the measured X-ray data and mapping the extracted threshold energy as the corrected threshold energy to a corresponding pixel.

14. The method according to claim 13, wherein the X-ray data is represented by a ratio of intensity of X-rays emitted to the predesigned phantom and intensity of X-rays having passed through the predesigned phantom.

15. The method according to claim 10, wherein the calculating comprises using at least one of interpolation, curve fitting, and weighted sum.

16. The method according to claim 15, wherein the calculating comprises estimating a function representing a relationship between the threshold energy and the X-ray data from the plurality of images of the target object obtained by using the plurality of approximate energies as the threshold energy and inserting the corrected threshold energy into the estimated function to calculate corrected X-ray data per pixel.

17. The method according to claim 15, wherein the calculating comprises applying weights to X-ray data respectively acquired by inputting the plurality of approximate energies as threshold energy and calculating the corrected X-ray data based on the weight applied X-ray data.

18. The method according to claim 15, wherein the X-ray data is represented by a ratio of intensity of X-rays emitted to the target object and intensity of X-rays passing through the target object.

19. An X-ray imaging apparatus comprising:
a photon counting detector (PCD) configured to count a number of photons having energy equal to or greater than threshold energy of the PCD, per pixel, among photons contained in X-rays passing through a target object;
a storage configured to store a mapping table in which each pixel is mapped to corrected threshold energy for obtaining normalized intensity of the X-rays passing through the target object corresponding to target threshold energy; and
controller configured to obtain an image of the target object corresponding to the target threshold energy based on the mapping table and a plurality of images of the target object, the plurality of images being obtained by using a plurality of approximate energies equal or approximate to the target threshold energy as the threshold energy of the PCD.

20. The X-ray imaging apparatus of claim 19, wherein the controller is further configured to calculate corrected normalized intensity of the X-rays passing through the target object by using at least one of interpolation, curve fitting, and weighted sum.

* * * * *